United States Patent
Hu et al.

(10) Patent No.: US 12,151,773 B2
(45) Date of Patent: Nov. 26, 2024

(54) METHOD FOR FORMING A BICYCLE FRAME COMPONENT MADE OF THERMOPLASTIC COMPOSITE LAMINATES AND THE BICYCLE FRAME FOR THE SAME

(71) Applicant: Astro Engineering Co., Ltd., Changhua (TW)

(72) Inventors: Samuel Hu, Changhua (TW); Liu-Cheng Liu, Changhua (TW)

(73) Assignee: ASTRO TECH CO., LTD., Changhua (TW)

( * ) Notice: Subject to any disclaimer, the term of this patent is extended or adjusted under 35 U.S.C. 154(b) by 740 days.

(21) Appl. No.: 17/333,774

(22) Filed: May 28, 2021

(65) Prior Publication Data

US 2021/0284269 A1    Sep. 16, 2021

Related U.S. Application Data

(63) Continuation-in-part of application No. PCT/CN2018/122595, filed on Dec. 21, 2018.

(51) Int. Cl.
*B62K 3/06* (2006.01)
*B29C 70/46* (2006.01)
(Continued)

(52) U.S. Cl.
CPC .............. *B62K 3/06* (2013.01); *B29C 70/462* (2013.01); *B29C 70/465* (2013.01);
(Continued)

(58) Field of Classification Search
CPC . B29C 70/462; B29C 70/465; B29K 2101/12; B29K 2307/04;
(Continued)

(56) References Cited

U.S. PATENT DOCUMENTS 5,624,519 A * 4/1997 Nelson ................... B62K 19/22
                                                              264/258
6,340,509 B1   1/2002 Nelson et al.
(Continued)

FOREIGN PATENT DOCUMENTS

CN    1143010 A    2/1997
CN    2272865 Y    1/1998
(Continued)

OTHER PUBLICATIONS

Liu, Yushu "Telephone Communication Line" 劉玉書,《電話通信線路》, 19891231 , CN.

*Primary Examiner* — Kevin Hurley
*Assistant Examiner* — Felicia L. Brittman-Alabi
(74) *Attorney, Agent, or Firm* — Best & Flanagan LLP

(57) ABSTRACT

A method for forming a bicycle frame component made of thermoplastic composite laminates has: a shell forming step: manufacturing multiple shells by compression molding; an overlapping step: overlapping two corresponding connecting margins of each two of the multiple shells to form an overlapping section of the two of the multiple shells and deploying a supporting unit within the multiple shells for supporting; a hot compressing connection step: heating and compressing the multiple shells to diffuse polymers of the multiple shells and to turn the multiple overlapping sections into multiple fusion areas for connection; a supporting unit removal step: removing the supporting unit disposed within the bicycle frame component.

15 Claims, 11 Drawing Sheets

(51) Int. Cl.
  *B29K 101/12* (2006.01)
  *B29K 307/04* (2006.01)
  *B29L 31/30* (2006.01)
(52) U.S. Cl.
  CPC ...... *B29K 2101/12* (2013.01); *B29K 2307/04* (2013.01); *B29L 2031/3091* (2013.01)
(58) Field of Classification Search
  CPC ..... B29L 2031/3091; B62K 3/04; B62K 3/06; B62K 19/16; B62K 21/02
  USPC .......... 280/281.1, 288.1, 284, 274; 264/46.6, 264/250, 257, 258
  See application file for complete search history.

(56) References Cited

U.S. PATENT DOCUMENTS

2022/0234676 A1* 7/2022 Scicchitano ........... B62K 21/12
2022/0289332 A1* 9/2022 Bosworth ............. B29C 70/446

FOREIGN PATENT DOCUMENTS

| | | |
|---|---|---|
| CN | 101786329 A | 7/2010 |
| CN | 202428969 U | 9/2012 |
| CN | 102729484 A | 10/2012 |
| CN | 103917355 A | 7/2014 |
| CN | 203726836 U | 7/2014 |
| CN | 104589662 A | 5/2015 |
| CN | 106660604 A | 5/2017 |
| CN | 107458001 A | 12/2017 |
| CN | 107922031 A | 4/2018 |
| DE | 4237834 A1 | 5/1994 |
| DE | 102011053100 A1 * | 2/2013 ............. B29C 65/02 |
| FR | 2614833 A3 | 11/1988 |
| JP | H079559 A | 1/1995 |
| JP | H10100278 A | 4/1998 |
| JP | H11192990 A | 7/1999 |
| TW | 201416287 A | 5/2014 |
| TW | 201515918 A | 5/2015 |
| TW | M519635 | 4/2016 |
| TW | M576098 U | 4/2019 |
| WO | WO9854046 A2 | 12/1998 |

* cited by examiner

METHOD FOR FORMING A BICYCLE FRAME COMPONENT MADE OF THERMOPLASTIC COMPOSITE LAMINATES AND THE BICYCLE FRAME FOR THE SAME

This application is a continuation-in-part of international Application No. PCT/CN2018/122595 filed on Dec. 21, 2018, which is incorporated herein by reference.

BACKGROUND OF THE INVENTION

1. Field of the Invention

The present invention relates to a method for forming a bicycle frame component, and more particularly to a method for forming a bicycle frame component made of thermoplastic composite.

2. Description of Related Art

Conventional methods for forming a bicycle frame component made of carbon reinforced composite as disclosed in CN1143010A, CN101786329A, and CN102729484A take a foam material or a bladder as a core. Then, carbon reinforced thermosetting composite laminates are laminated on the core to form a pre-structure. The pre-structure is placed into molds, is heated, is compressed, and hardens. The hardened pre-structure is removed from the molds, and the core within the hardened pre-structure is removed and demolded. Eventually, the hardened pre-structure is trimmed to complete a product of the bicycle frame.

However, the conventional methods are restricted by conditions of pressure and hardening temperature of thermosetting composite laminates and take 50 to 60 minutes to form a bicycle frame component. The conventional methods for forming a bicycle frame component made of carbon reinforced composite take lots of time and are not suitable for mass production.

In addition, the cores of the conventional methods for forming a bicycle frame provide poor or insufficient support, so the bicycle frame components manufactured by the conventional methods have uneven surfaces and the defect of unstable structural rigidity. Since the thermosetting composite laminates are irreversibly hardened during molding, the bicycle frame component made of thermosetting composite laminates cannot be repaired or recycled. The conventional methods for forming a bicycle frame component have many limits on performance and application.

To overcome the shortcomings of the conventional methods for forming a bicycle frame component, the present invention provides a method for forming a bicycle frame component to mitigate or obviate the aforementioned problems.

SUMMARY OF THE INVENTION

The main objective of the present invention is to provide a method for forming a bicycle frame component that turns thermoplastic composite into a bicycle frame component by compression molding.

The method for forming a bicycle frame component made of thermoplastic composite laminates comprises the following steps: a shell forming step: manufacturing multiple shells by compression molding; an overlapping step: overlapping two corresponding connecting margins of each two of the multiple shells to form an overlapping section of the two of the multiple shells and deploying a supporting unit within the multiple shells for supporting; a hot compressing connection step: heating and compressing the multiple shells to diffuse polymers of the multiple shells and to turn the multiple overlapping sections into multiple fusion areas for connection; and a supporting unit removal step: removing the supporting unit disposed within the bicycle frame component.

In the present invention, the multiple shells are enclosed in molds for being heated and compressed. The molecules of the polymers of the multiple shells are diffused for connection of the multiple shells. The multiple shells are connected without applying additional adhesive or additional welding strips. The multiple shells are provided with sufficient connection. And the method for forming a bicycle frame component in accordance with the present invention is convenient and timesaving.

Other objects, advantages, and novel features of the invention will become more apparent from the following detailed description when taken in conjunction with the accompanying drawings.

DETAILED DESCRIPTION OF PREFERRED EMBODIMENTS

A method for forming a bicycle frame component 20 made of thermoplastic composite laminates 10 has a shell forming step, an overlapping step, a hot compressing connection step, and a supporting unit removal step. With reference to FIGS. 1 to 5, a first embodiment is illustrated for manufacturing a bicycle frame component 20.

Figure 1:
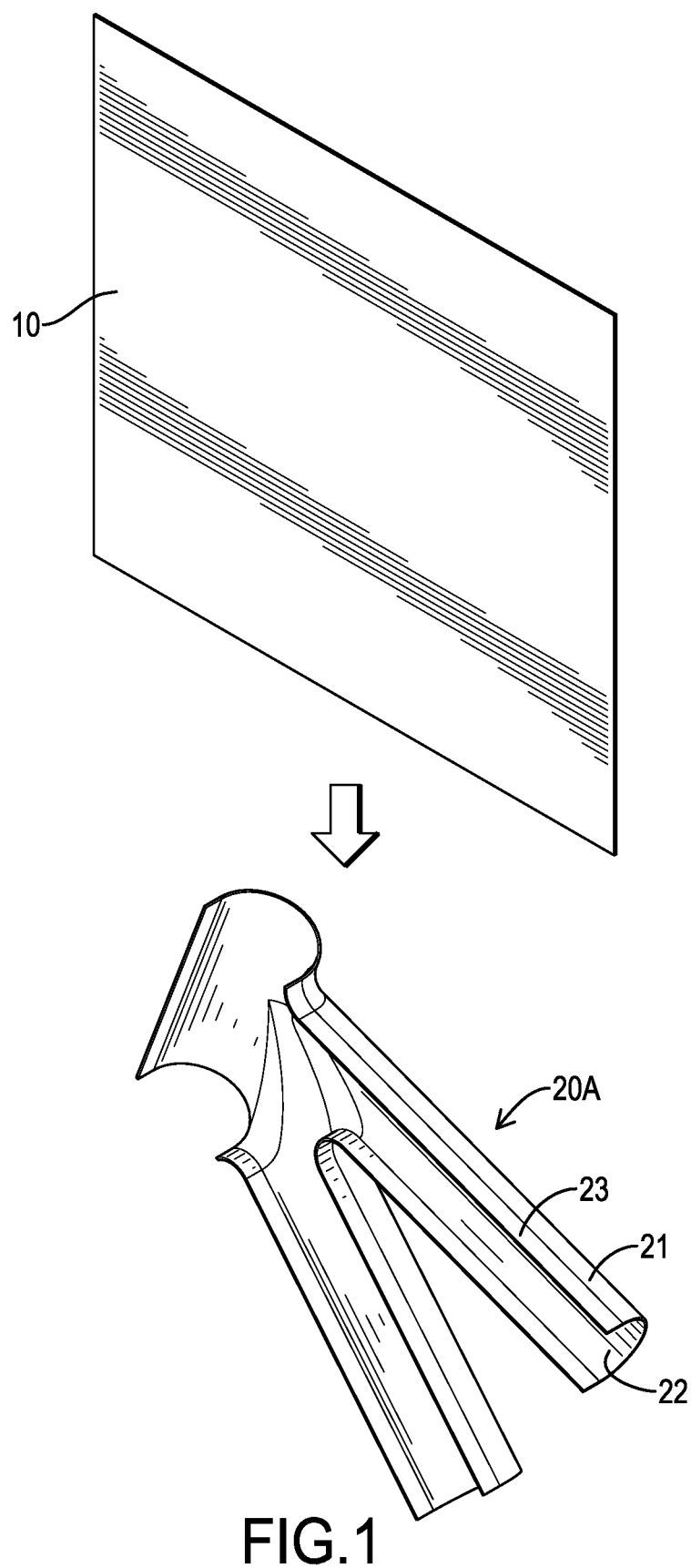
FIG. 1 shows perspective views of a first embodiment of a shell of a bicycle frame component in accordance with the present invention showing a thermoplastic composite laminate turned into the shell.
Figure 5:
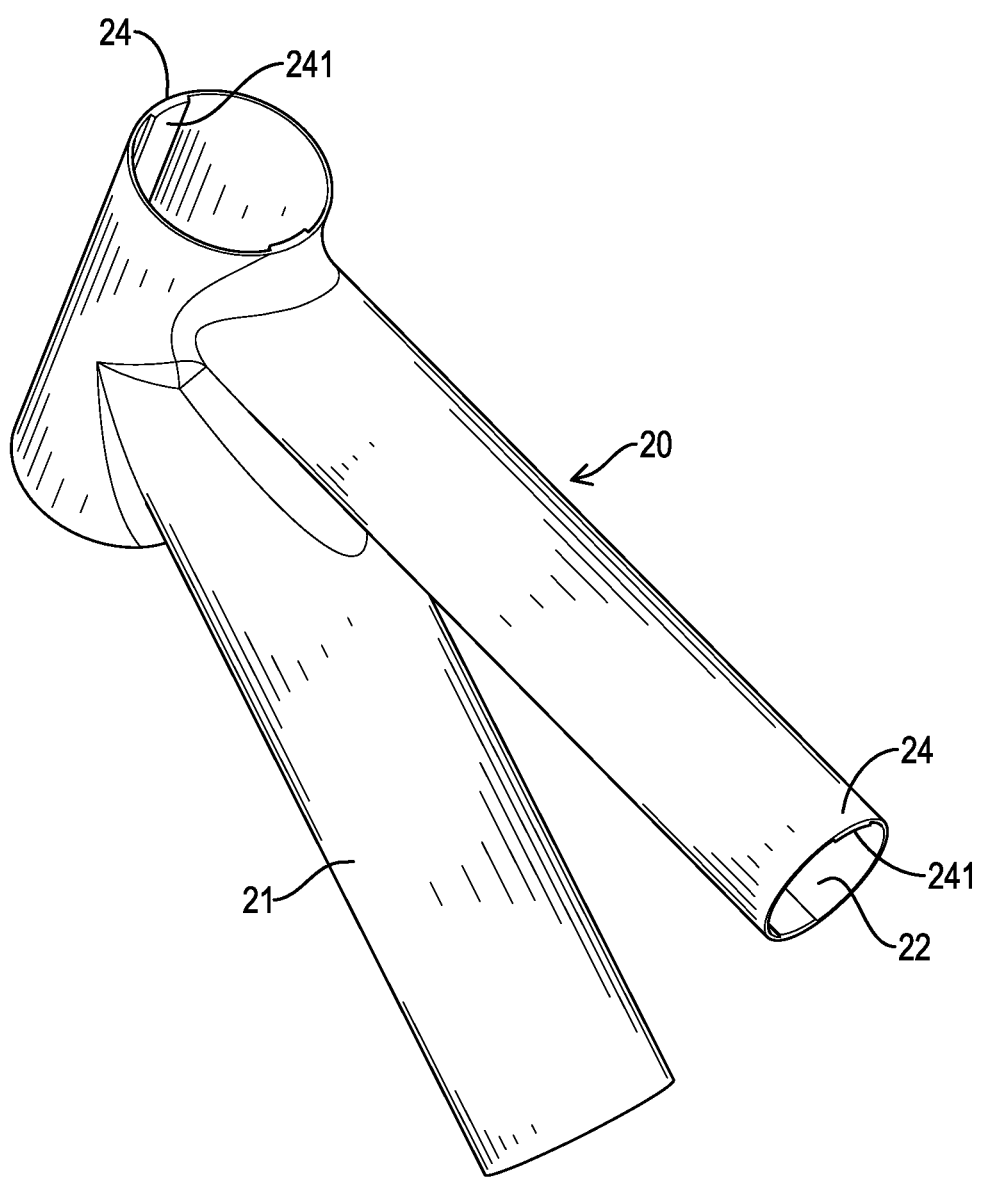
FIG. 5 is a perspective view of the first embodiment of the bicycle frame component in FIG. 1.

With reference to FIGS. 1 and 5, the bicycle frame component 20 is composed of two shells 20A, 20B that are capable of being symmetrically assembled together. In the shell forming step, two thermoplastic composite laminates are turned into the two shells 20A, 20B by compression molding. Each one of the two composite laminates may be carbon fiber reinforced thermoplastic composite laminates or glass fiber reinforced thermoplastic composite laminates. In the shell forming step, each one of the two shells 20A, 20B may be manufactured by a complete thermoplastic composite laminate. Alternatively, the complete thermoplastic composite laminate may be cut according to the outline of molds for compression molding. After molding, the two shells 20A, 20B are trimmed to finish the two shells 20A, 20B.

Multiple layers of prepregs composed of a polymer matrix and multiple fibers are trimmed, are stacked up or placed in sequence, and then are compressed with heat and pressure. When the temperature of the polymer matrix rises above the glass transition temperature (Tg) of the polymer matrix, molecules of polymer matrix of each two layers of prepregs diffuse to connect the two layers of prepregs without applying additional adhesive. In the present invention, the polymer matrix is thermoplastic matrix, and the reinforcements of the prepregs may be implemented as carbon fibers, glass fibers, etc. The reinforcements of the prepregs may be woven fabrics or unidirectional fabrics. The numbers of layers of the prepregs and the orientation of each layer of the prepregs are decided according to thickness or function of product. In the shell forming step, the glass transition temperature (Tg) of the polymer matrix, which is the thermoplastic matrix, is about 150° C. to 190° C., the heating temperature of molds for compressing is about 220° C. to 300° C., and the pressurizing pressure is less than and equal to 1 MPa.

Figure 2:
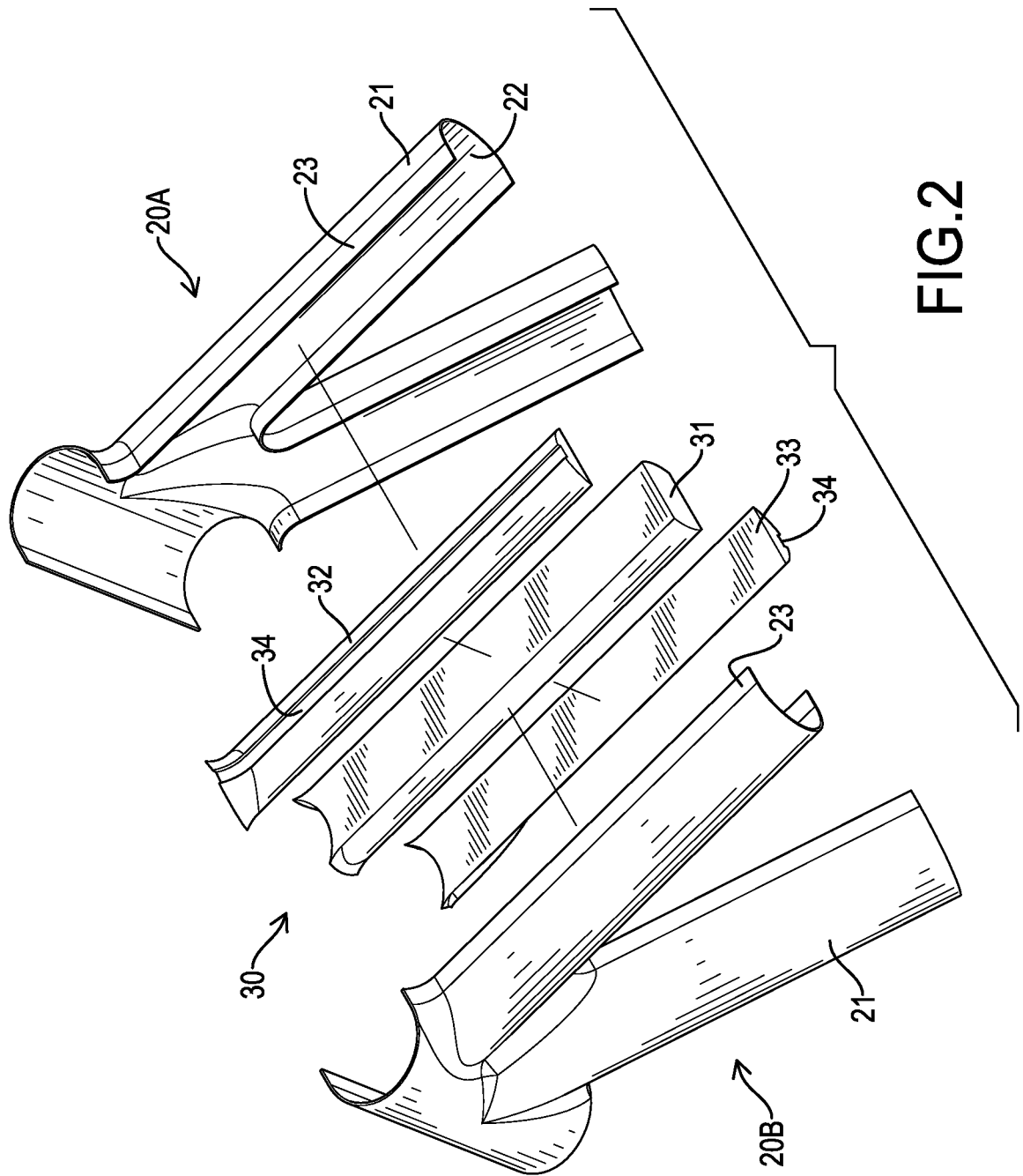
FIG. 2 is an exploded perspective view of two shells in FIG. 1 and a supporting unit for supporting the two shells.

With reference to FIG. 2, each one of the two shells 20A, 20B has an exterior surface 21, a cavity 22 surrounded by the shell 20A, 20B, and multiple connecting margins 23. Each one of the multiple connecting margins 23 is configured to be connected to one corresponding connecting margin 23 of the other one of the two shells 20A, 20B. In the first embodiment, in order to make the two corresponding connecting margins 23 overlap, each one of the multiple connecting margins 23 has a width that is about 2.5 to 6 mm from the symmetric line of the bicycle frame component 20. Therefore, when the two corresponding connecting margins 23 of the two shells 20A, 20B are overlapped, an overlapping section of the two shells 20A, 20B has a width that is about 5 to 12 mm. In the present invention, the number of the shells of the bicycle frame 20 may be three or more. The shells are capable of being symmetrically assembled together, and the number of the shells is not limited in the present invention.

Figure 3:
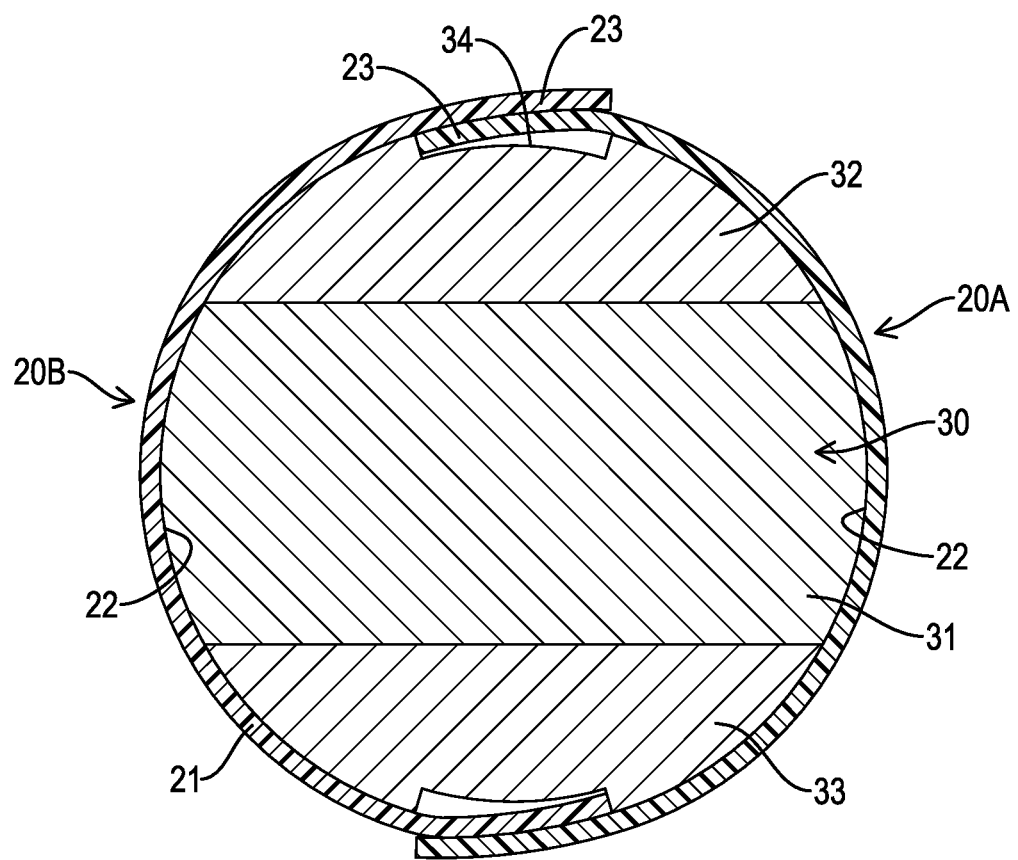
FIG. 3 is an enlarged cross sectional side view of the two shells and the supporting unit in FIG. 2.

In the overlapping step: with reference to FIGS. 2 and 3, the two shells 20A, 20B are symmetrically assembled with each other, and the two corresponding connecting margins 23 of the two shells 20A, 20B are overlapped. In the first embodiment, the two shells 20A, 20B have two overlapping sections, and the width of the overlapping sections of the two shells 20A, 20B is about 8 mm. In order to provide the two shells 20A, 20B with sufficient support during the subsequent compressing connection step, a supporting unit 30 is deployed within the two shells 20A, 20B in the overlapping step. The supporting unit 30 may be made of metal, foam, wax, or even an air bag for molding, etc. The form of the supporting unit 30 is not limited in the present invention. With reference to FIG. 2, the supporting unit 30 is made of metal and is composed of a middle supporting member 31, an upper supporting member 32, and a lower supporting member 33. The supporting unit 30 has two receiving recesses 34 corresponding to the two overlapping sections of the two shells 20A, 20B in number and position. In the first embodiment of the present invention, the two receiving recesses 34 are respectively defined in the upper supporting member 32 and the lower supporting member 33.

Figure 4:
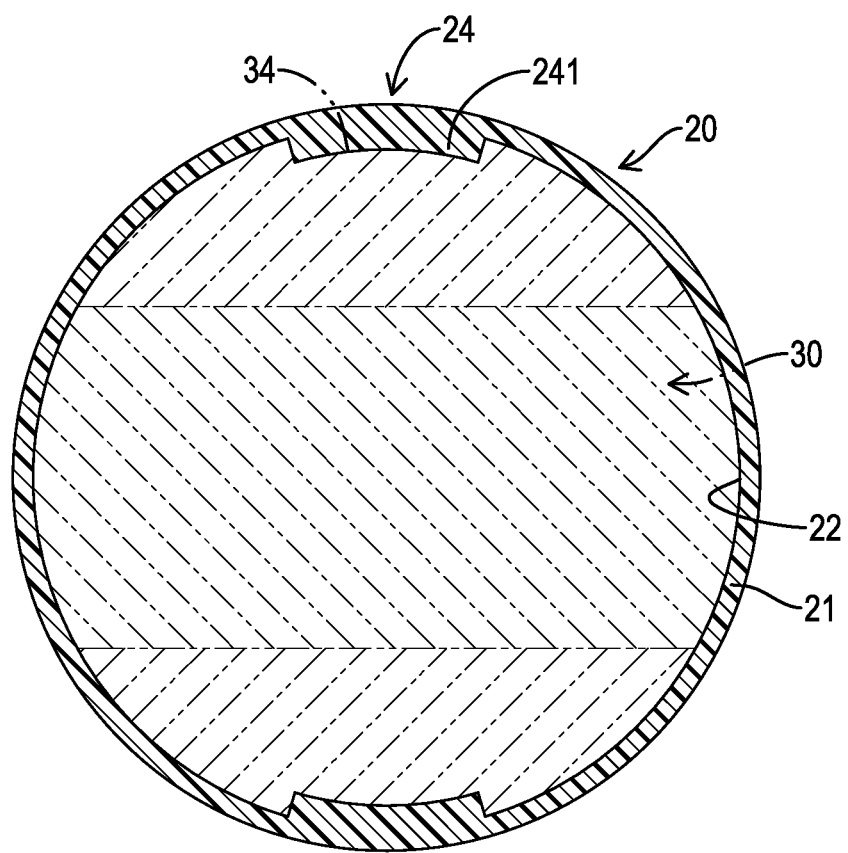
FIG. 4 is an enlarged cross sectional side view of the two shells and the supporting unit in FIG. 2 showing the two shells fused together after heating and compressing.

In the hot compressing connection step: with reference to FIGS. 3 and 4, the two shells 20A, 20B are heated and compressed by compression molding to diffuse molecules of the polymers of the two shells 20A, 20B to turn the two overlapping sections into two fusion areas 24, and to connect the two shells 20A, 20B to form the bicycle frame component 20. In the present invention, the two shells 20A, 20B are enclosed in molds, are heated, and are compressed to diffuse molecules of the polymers of the two shells 20A, 20B. The two shells 20A, 20B are connected without applying additional adhesive and are provided with sufficient connection.

In the hot compressing connection step, the glass transition temperature (Tg) of the polymer matrix, which is the thermoplastic matrix, is about 150° C. to 190° C., the heating temperature of molds for compressing is about 240° C. to 300° C., and the pressurizing pressure is about 9 MPa to 25 MPa. After heating and compressing for 2 to 5 minutes, the pressure of the molds is maintained between 9 MPa and 25 MPa, and the molds are cooled down to less than and equal to 100° C. Then the bicycle frame component 20 is removed from the molds. In the first embodiment, each one of the two overlapping sections formed by the two corresponding connecting margins 23 of the two shells 20A, 20B is fused to flow into a corresponding one of the two receiving recesses 34, and is turned into a fused protrusion 241. The fused protrusion 241 of each one of the two fusion areas 24 has a thickness larger than a thickness of each one of the two shells 20A, 20B. The fused protrusions 241 of each one of the two fusion areas 24 with larger thickness enhance the rigidity of the fusion area 24 of the bicycle frame component 20.

In the supporting unit removal step: with reference to FIGS. 4 and 5, after accomplishing the hot compressing connection step, the supporting unit 30 disposed within the bicycle frame component 20 is removed. In the first embodiment, the middle supporting member 31 is removed at first, and then the upper supporting member 32 and the lower supporting member 33 are removed in sequence. Then, the bicycle frame component 20 is trimmed to finish the bicycle frame component 20.

The method for forming the bicycle frame component 20 made of thermoplastic composite turns the thermoplastic composite laminates 10 into the two shells 20A, 20B by compression molding at first. Then, heat and compress the two shells 20A, 20B to fuse and to connect the two shells 20A, 20B. At last, the two shells 20A, 20B are connected and turned into the complete bicycle frame component 20. With the method in accordance with the present invention, the entire manufacturing process is quick and only takes about 5 minutes for molding. The conventional method for manufacturing bicycle frame components made of thermosetting composite takes 50 to 60 minutes for molding. Compared to the conventional method, the method in accordance with the present invention speeds up molding 10 times, saves labor, is suitable for mass production, and has profound industrial utility.

With reference to FIGS. 2 and 5, the bicycle frame component 20 has the two shells 20A, 20B. The two shells 20A, 20B are made of thermoplastic composite by compression molding. The two shells 20A, 20B are symmetrically connected to each other. Each one of the two overlapping sections is fused and turns into one of two fused areas 24.

The method in accordance with the present invention turns the thermoplastic composite into the two shells 20A, 20B. Then, heat and compress the two shells 20A, 20B and connect the two shells 20A, 20B accordingly. The method in accordance with the present invention stabilizes the quality of the bicycle frame component 20 and makes the bicycle frame component 20 have merits of lightweight and rigid structure. Since the thermoplastic composite can be repeatedly melted by heating and repeatedly hardened by cooling, the bicycle frame component 20 manufactured by the method in accordance with the present invention can be repaired and is recyclable and reusable. The bicycle frame component 20 manufactured by the method in accordance with the present invention is ecofriendly.

Figure 6:
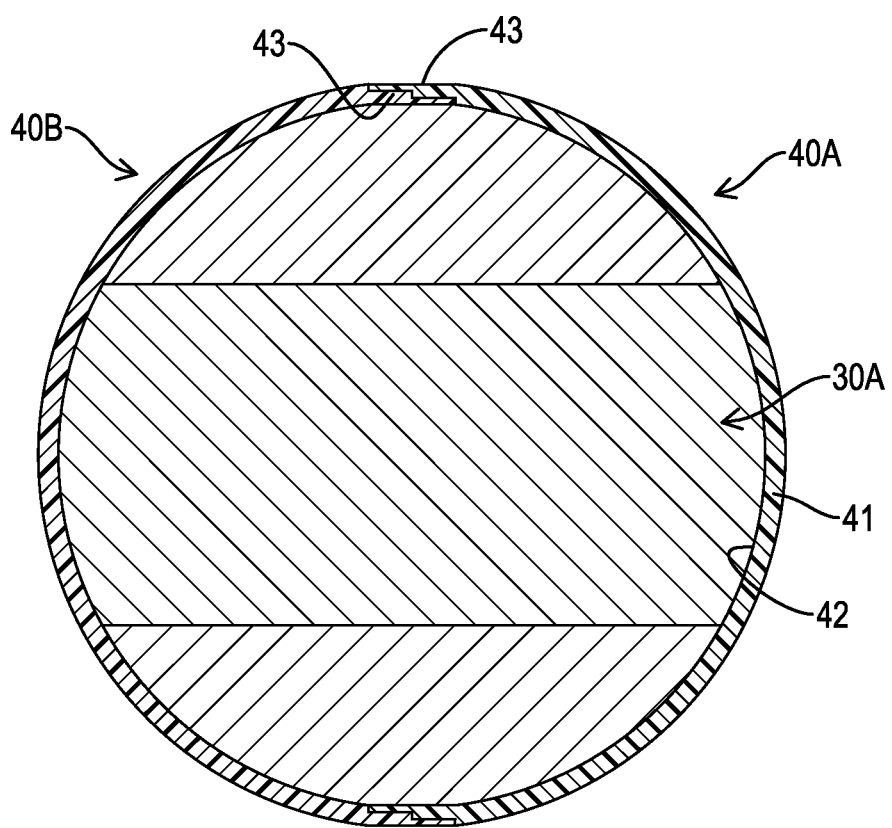
FIG. 6 is a cross sectional side view of a second embodiment of two shells and a supporting unit of a bicycle frame component in accordance with the present invention.

With reference to FIG. 6, in a second embodiment, the bicycle frame component has the two shells 40A, 40B. Each one of the two shells 40A, 40B has the exterior surface 41, the cavity 42, and two connecting margins 43. Each one of the two connecting margins 43 has a stepped structure. The two stepped structures of the two connecting margins 43 of one of the two shells 40A/40B structurally correspond to the two stepped structures of the two connecting margins 43 of the other one of the two shells 40B/40A. The two stepped structures of the two connecting margins 43 of one of the two shells 40A/40B respectively overlap the two stepped structures of the two connecting margins 43 of the other one of the two shells 40B/40A. In the second embodiment, the two receiving recesses of the supporting unit 30 are omitted. Each two corresponding connecting margins 43 of the multiple connecting margins 43 of the two shells 40A, 40B are heated, are compressed, and are fused together.

Figure 7:
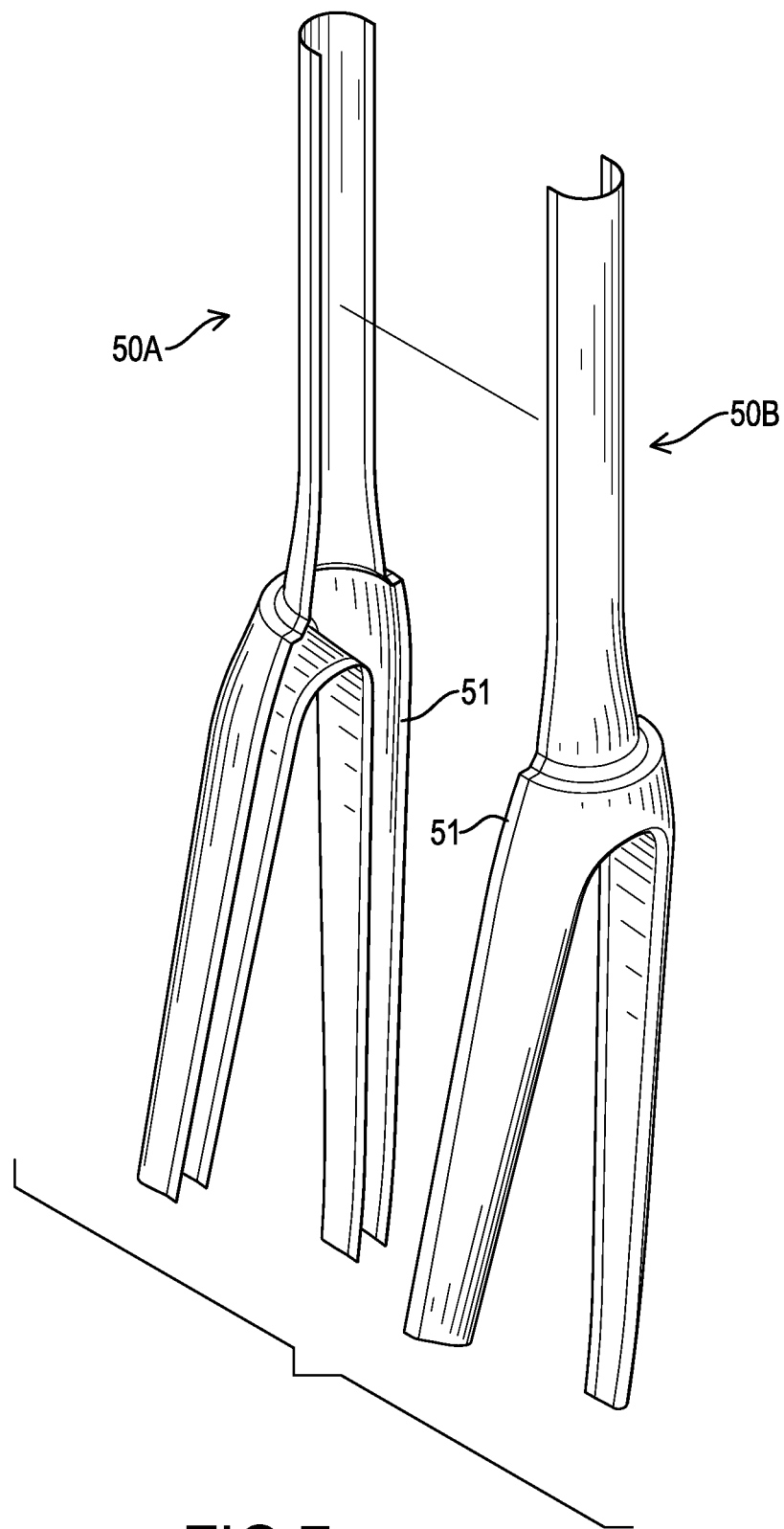
FIG. 7 is an exploded perspective view of a third embodiment of two shells in accordance with the present invention.
Figure 8:
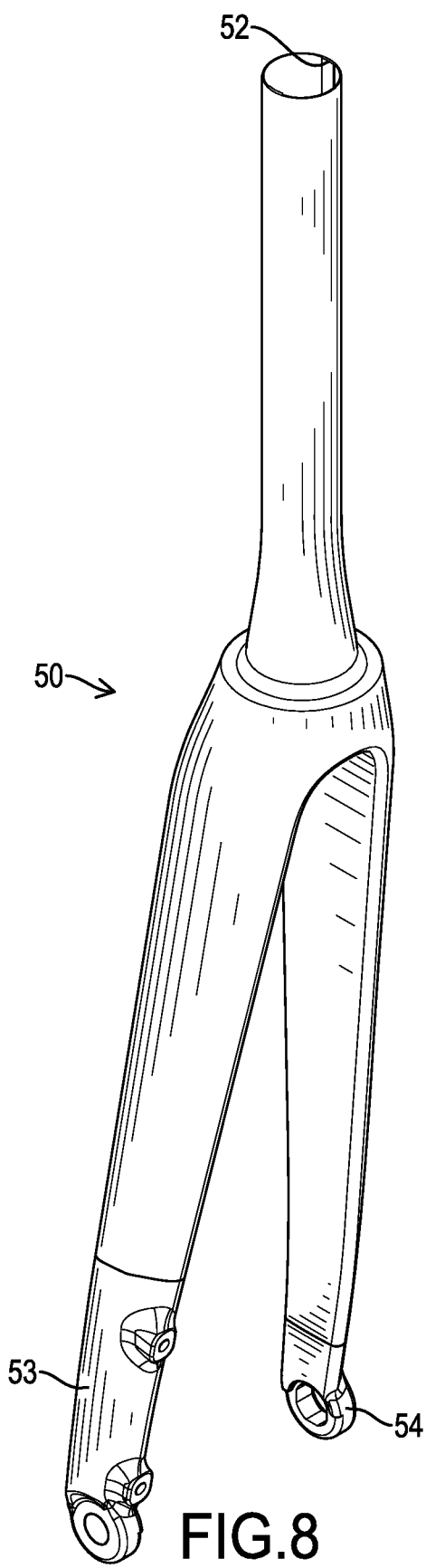
FIG. 8 is a perspective view of the bicycle frame component composed by the two shells in FIG. 7 showing the bicycle frame component connected with two dropouts.

With reference to FIGS. 7 and 8, a third embodiment in accordance with the present invention shows manufacturing of a front fork of a bicycle. The bicycle frame component 50 is the front fork of the bicycle and is separated into two shells 50A, 50B capable of being symmetrically assembled together. The two shells 50A, 50B are oppositely separated toward the front side and the rear side in FIG. 7. Each one of the two shells 50A, 50B also has two connecting margins 51 for symmetrically assembling the two shells 50A, 50B. Each two corresponding connecting margins 51 of the two shells 50A, 50B are heated, are compressed, and are fused together to turn into a fused area 52. The bicycle frame component 50 is assembled with two dropouts 53, 54 to complete the front fork of the bicycle shown in FIG. 8.

Figure 9:
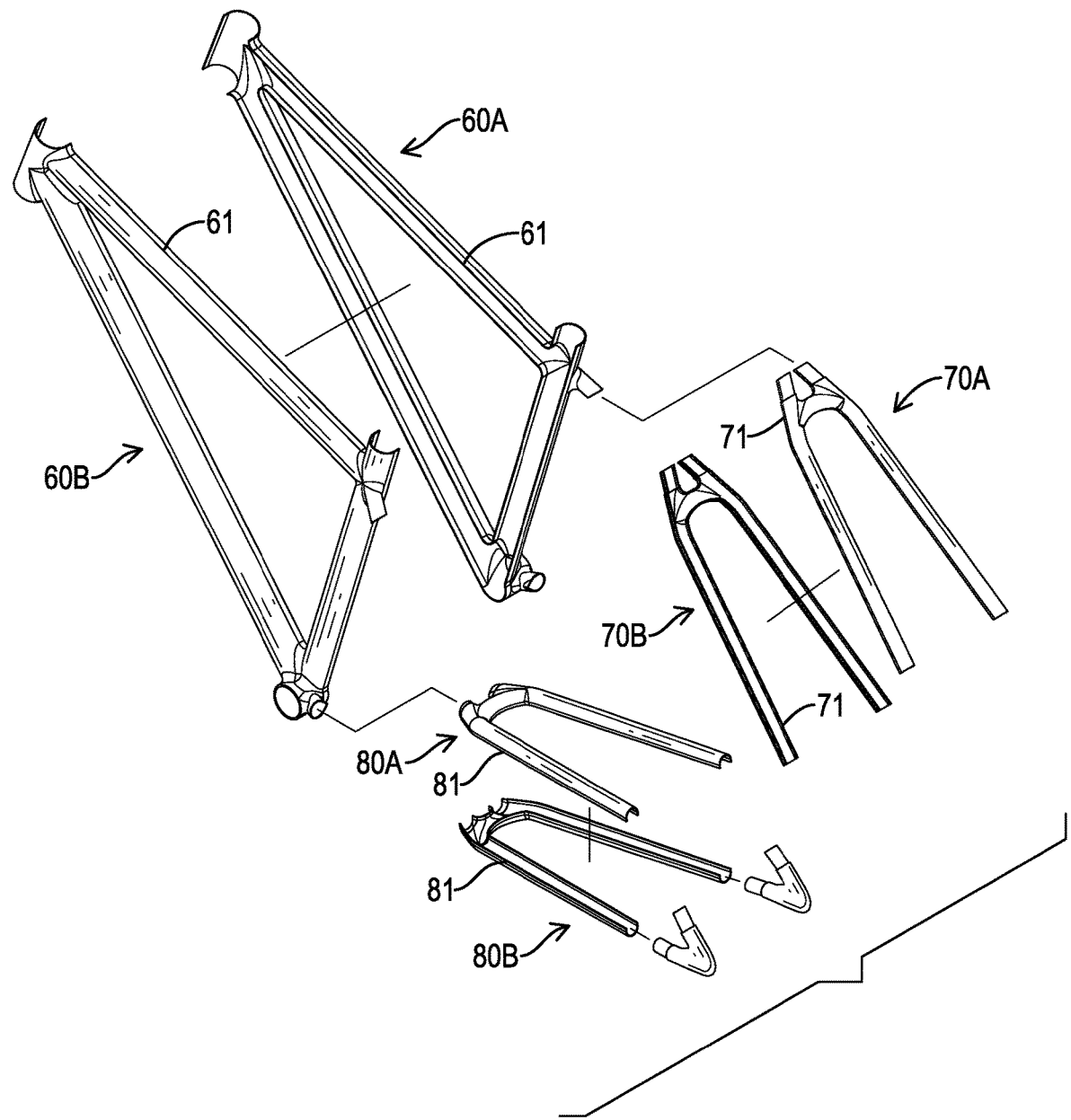
FIG. 9 is an exploded perspective view of a fourth embodiment of a bicycle frame in accordance with the present invention showing the bicycle frame is composed by multiple shells.
Figure 10:
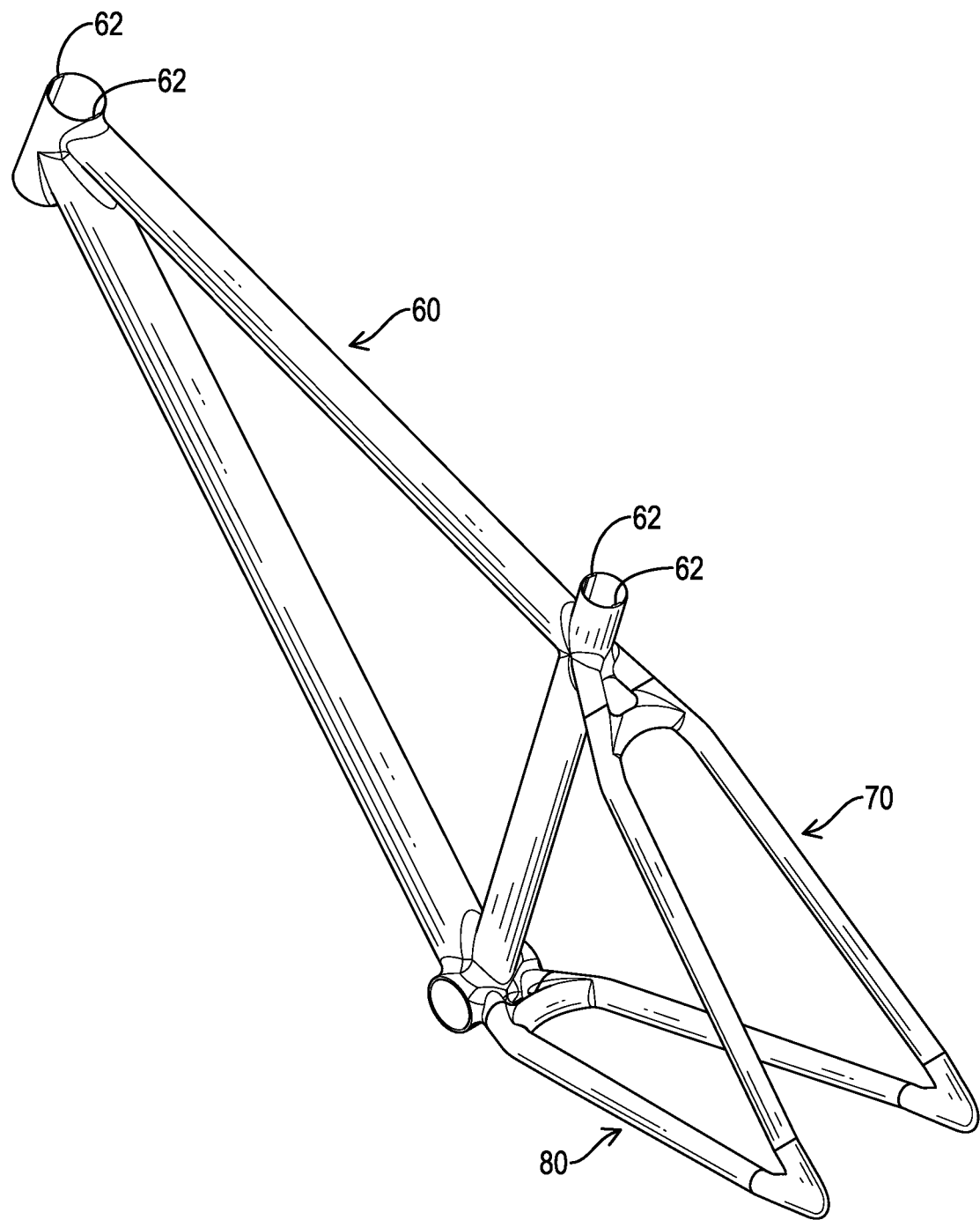
FIG. 10 is a perspective view of the bicycle frame in FIG. 9.

With reference to FIGS. 9 and 10, a fourth embodiment in accordance with the present invention shows manufacturing of an entire bicycle frame. The bicycle frame is composed of a first bicycle frame component 60, a second bicycle frame component 70, and a third bicycle frame component 80. The first bicycle frame component 60 is a main triangular portion of the bicycle frame and is oppositely separated into two first shells 60A, 60B toward the left side and the right side in FIG. 9. And the two first shells 60A, 60B are capable of being symmetrically assembled together. The second bicycle frame 70 is a seat stay of the bicycle frame and is oppositely separated into two second shells 70A, 70B toward the upper side and the lower side in FIG. 9. The two second shells 70A, 70B are also capable of being symmetrically assembled together. The third bicycle frame 80 is a chain stay of the bicycle frame and is also oppositely separated into two second shells 80A, 80B toward the upper side and the lower side in FIG. 9. The two second shells 80A, 80B are capable of being symmetrically assembled together as well.

In the third embodiment, each one of the shells 60A, 60B, 70A, 70B, 80A, 80B has two connecting margins 61, 71, 81 configured to be symmetrically assembled. The connecting margins 61, 71, 81 facilitate the first shells 60A, 60B, the second shells 70A, 70B, and the third shells 80A, 80B to be heated, compressed, and fused together. With reference to FIG. 10, the connecting margins 61 of the first shells 60A, 60B are heated, are compressed, and are fused to turn into a fused area 62. Assemble the first bicycle component 60, the second bicycle component 70, and the third bicycle component 80 to complete the bicycle frame composed of the first bicycle component 60, the second bicycle component 70, and the third bicycle component 80.

Figure 11:
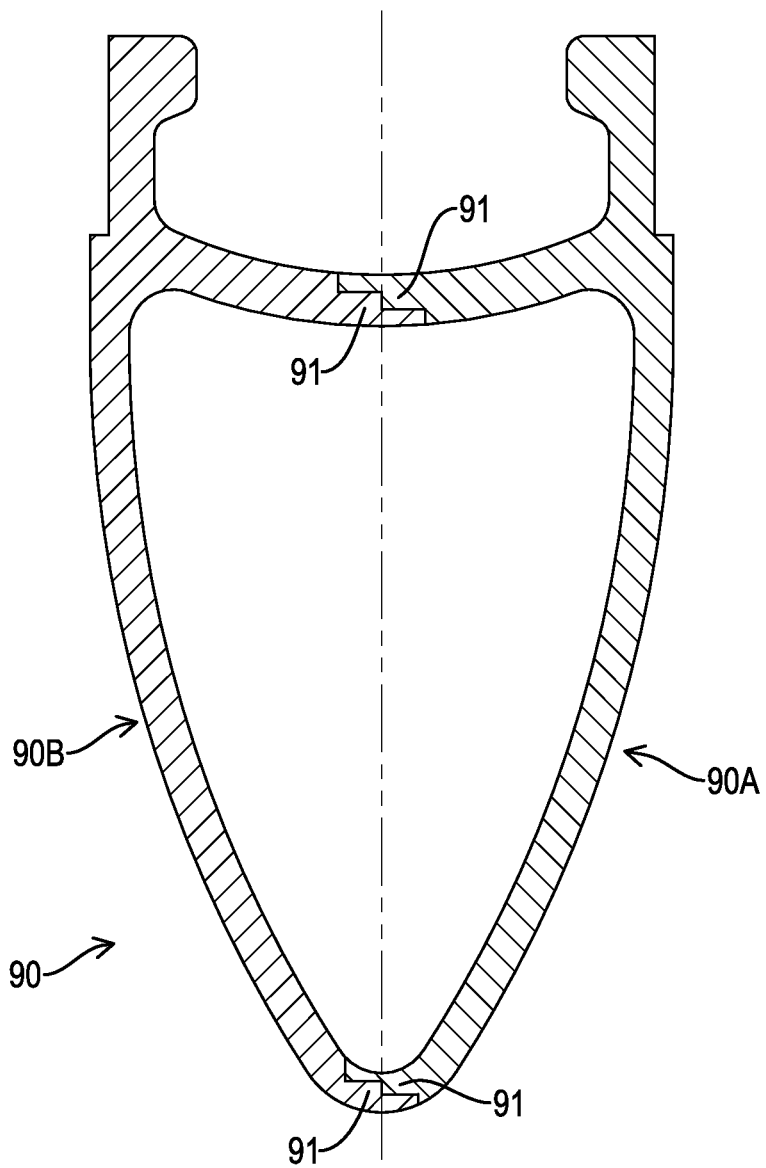
FIG. 11 is a cross sectional side view of a fifth embodiment of two fourth shells of a wheel rim of a bicycle frame component in accordance with the present invention.

In the third embodiment of the present invention, the method of the present invention is applied to manufacture a front fork of a bicycle. In the fourth embodiment of the present invention, the method of the present invention is applied to manufacture an entire bicycle frame. Therefore, the method of the present invention can be applied to any part of a bicycle frame that is hollow such as a wheel rim 90. A cross-sectional view of the wheel rim 90 is shown in FIG. 11, and the wheel rim 90 has two fourth shells 90A, 90B. Each one of the two fourth shells 90A, 90B has two connecting margins 91. The two fourth shells 90A, 90B are capable of being symmetrically assembled together as the third embodiment and the fourth embodiment.

What is claimed is:

1. A method for forming a bicycle frame component made of thermoplastic composite, characterized in that the method comprises:
    a shell forming step: turning multiple thermoplastic composite laminates into multiple shells that are capable of being symmetrically assembled together by compression molding, wherein each one of the multiple shells has
        an exterior surface;
        a cavity surrounded by the shell; and
        multiple connecting margins, each one of the multiple connecting margins configured to be connected to a corresponding one of the multiple connecting margins of another one of the multiple shells;
    an overlapping step: overlapping two corresponding connecting margins of each two of the multiple shells to form an overlapping section of the two of the multiple shells; and deploying a supporting unit within the multiple shells to support each one of the multiple shells;
    a hot compressing connection step: heating and compressing the multiple overlapping sections of the multiple shells by compression molding to diffuse polymers of the multiple shells, to turn the multiple overlapping sections into multiple fusion areas, and to connect the multiple shells to form the bicycle frame component; and
    a supporting unit removal step: removing the supporting unit disposed within the bicycle frame component accompanied with trimming the bicycle frame component to finish the bicycle frame component.

2. The method for forming a bicycle frame component made of thermoplastic composite as claimed in claim 1, wherein the thermoplastic composite laminates are carbon fiber reinforced thermoplastic composite laminates or glass fiber reinforced thermoplastic composite laminates.

3. The method for forming a bicycle frame component made of thermoplastic composite as claimed in claim 2, wherein the multiple shells are two shells.

4. The method for forming a bicycle frame component made of thermoplastic composite as claimed in claim 3, wherein each one of the multiple fusion areas has a fused protrusion with a thickness larger than a thickness of each one of the multiple shells.

5. The method for forming a bicycle frame component made of thermoplastic composite as claimed in claim 4, wherein
   the supporting unit has multiple receiving recesses corresponding to the multiple overlapping sections in position;
   each one of the multiple fusion areas forms a fused protrusion disposed within a corresponding one of the multiple receiving recesses and corresponds to said corresponding receiving recess in shape.

6. The method for forming a bicycle frame component made of thermoplastic composite as claimed in claim 5, wherein the supporting unit is made of metal and has a middle supporting member, an upper supporting member, and a lower supporting member.

7. The method for forming a bicycle frame component made of thermoplastic composite as claimed in claim 3, wherein
   each one of the two corresponding connecting margins has a stepped structure configured to be overlapped and engaging with the stepped structure of the other one of the two connecting margins; and
   the two stepped structures of the two corresponding connecting margins are overlapped and engaged with each other in the overlapping step.

8. The method for forming a bicycle frame component made of thermoplastic composite as claimed in claim 2, wherein each one of the multiple fusion areas has a fused protrusion with a thickness larger than a thickness of each one of the multiple shells.

9. The method for forming a bicycle frame component made of thermoplastic composite as claimed in claim 8, wherein
   the supporting unit has multiple receiving recesses corresponding to the multiple overlapping sections in position;
   each one of the multiple fusion areas forms a fused protrusion disposed within a corresponding one of the multiple receiving recesses and corresponds to said corresponding receiving recess in shape.

10. The method for forming a bicycle frame component made of thermoplastic composite as claimed in claim 9, wherein the supporting unit is made of metal and has a middle supporting member, an upper supporting member, and a lower supporting member.

11. The method for forming a bicycle frame component made of thermoplastic composite as claimed in claim 2, wherein
    each one of the two corresponding connecting margins has a stepped structure configured to be overlapped and engaging with the stepped structure of the other one of the two connecting margins; and
    the two stepped structures of the two corresponding connecting margins are overlapped and engaged with each other in the overlapping step.

12. The method for forming a bicycle frame component made of thermoplastic composite as claimed in claim 1, wherein each one of the multiple fusion areas has a fused protrusion with a thickness larger than a thickness of each one of the multiple shells.

13. The method for forming a bicycle frame component made of thermoplastic composite as claimed in claim 12, wherein
    the supporting unit has multiple receiving recesses corresponding to the multiple overlapping sections in position;
    each one of the multiple fusion areas forms a fused protrusion disposed within a corresponding one of the multiple receiving recesses and corresponds to said corresponding receiving recess in shape.

14. The method for forming a bicycle frame component made of thermoplastic composite as claimed in claim 13, wherein the supporting unit is made of metal and has a middle supporting member, an upper supporting member, and a lower supporting member.

15. The method for forming a bicycle frame component made of thermoplastic composite as claimed in claim 1, wherein
    each one of the two corresponding connecting margins has a stepped structure configured to be overlapped and engaging with the stepped structure of the other one of the two connecting margins; and
    the two stepped structures of the two corresponding connecting margins are overlapped and engaged with each other in the overlapping step.

* * * * *